(12) United States Patent
Richmond et al.

(10) Patent No.: US 6,863,759 B2
(45) Date of Patent: Mar. 8, 2005

(54) METHODS FOR MAKING COMPOSITE BONDED STRUCTURES

(75) Inventors: Michael A. Richmond, Newark, DE (US); Michael K. Aghajanian, Newark, DE (US); Allyn L. McCormick, Oxford, PA (US); W. Michael Waggoner, Newark, DE (US); Brian E. Schultz, Kennett's Square, PA (US)

(73) Assignee: M Cubed Technologies, Inc., Monroe, CT (US)

( * ) Notice: Subject to any disclaimer, the term of this patent is extended or adjusted under 35 U.S.C. 154(b) by 160 days.

(21) Appl. No.: 10/055,820

(22) Filed: Jan. 23, 2002

(65) Prior Publication Data

US 2002/0144773 A1 Oct. 10, 2002

Related U.S. Application Data

(60) Provisional application No. 60/264,000, filed on Jan. 24, 2001.

(51) Int. Cl.$^7$ .............................. B32B 7/08; B32B 31/20; C04B 33/00; C04B 35/524; C01B 31/36
(52) U.S. Cl. ....................... 156/92; 156/293; 156/272.2; 264/642; 501/88; 501/89; 501/99; 423/345; 423/346
(58) Field of Search ............................ 156/91, 92, 293, 156/305, 272.2, 275.5, 278; 264/29.1, 29.5, 640, 642; 501/87, 88, 89, 90, 95.1, 99; 423/345, 346

(56) References Cited

U.S. PATENT DOCUMENTS

| | | | |
|---|---|---|---|
| 4,070,197 A | 1/1978 | Coes | |
| 4,238,540 A | 12/1980 | Yates et al. | |
| 4,592,268 A | 6/1986 | Hartsock | |

(List continued on next page.)

FOREIGN PATENT DOCUMENTS

| | | |
|---|---|---|
| DE | 197 11 831 A1 | 9/1998 |
| JP | 02-088470 | 3/1990 |
| JP | 08-157275 | 6/1996 |

OTHER PUBLICATIONS

C.J. Shih and A. Ezis, "The Application of Hot–Pressed Silicon Carbide to Large High–Precision Optical Structures", *SPIE*, vol. 2543, Aug. 1995, pp. 24–26, 33.

(List continued on next page.)

*Primary Examiner*—J. A. Lorengo
(74) *Attorney, Agent, or Firm*—Law Office of Jeffrey R. Ramberg

(57) ABSTRACT

Techniques to bond two or more smaller bodies or subunits to produce a unitary SiC composite structure extend the capabilities of reaction-bonded silicon carbide, for example, by making possible the fabrication of complex shapes. In a first aspect of the present invention, two or more preforms are bonded together with a binder material that imparts at least strength sufficient for handling during subsequent thermal processing. In a second aspect of the present invention, instead of providing the subunits to be bonded in the form of preforms, the subunits may be dense, SiC composite bodies, e.g., RBSC bodies. In each of the above embodiments, a preferable means for bonding two or more subunits combines aspects of adhesive and mechanical locking characteristics. One way to accomplish this objective is to incorporate a mechanical locking feature to the joining means, e.g., a "keyway" feature. The mechanical locking feature thus substitutes for, or supplements the binder qualities of the adhesive, which is especially important when the adhesive itself may be or become weak due to, for example, thermal processing.

19 Claims, 3 Drawing Sheets

U.S. PATENT DOCUMENTS

| | | | |
|---|---|---|---|
| 4,608,318 A | | 8/1986 | Makrides et al. |
| 4,621,001 A | | 11/1986 | Bard |
| 4,921,554 A | | 5/1990 | Bates |
| 5,079,195 A | * | 1/1992 | Chiang et al. ................. 501/92 |
| 5,310,434 A | * | 5/1994 | Vives et al. ................... 156/92 |
| 5,509,555 A | * | 4/1996 | Chiang et al. ................. 216/56 |
| 5,526,867 A | | 6/1996 | Keck et al. |
| 5,585,190 A | | 12/1996 | Newkirk et al. |
| 5,840,221 A | * | 11/1998 | Lau et al. ................... 264/29.7 |
| 6,162,019 A | | 12/2000 | Effinger |

OTHER PUBLICATIONS

M. Singh, "Joining of Silicon Carbide–Based Ceramic Materials for High Temperature Applications", *Industrial Heating*, Sep. 1997, pp. 91–93.

* cited by examiner

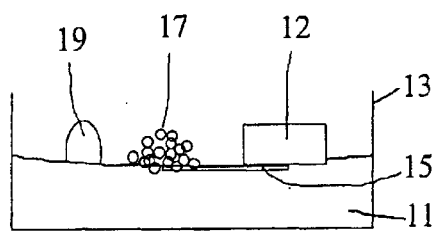
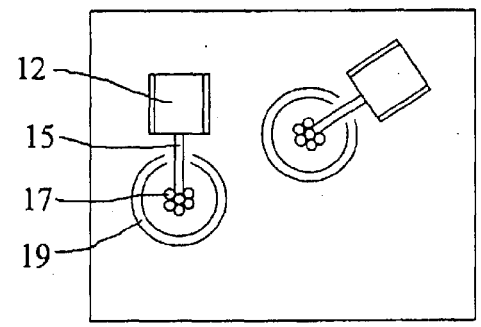
Fig. 1A  Fig. 1B
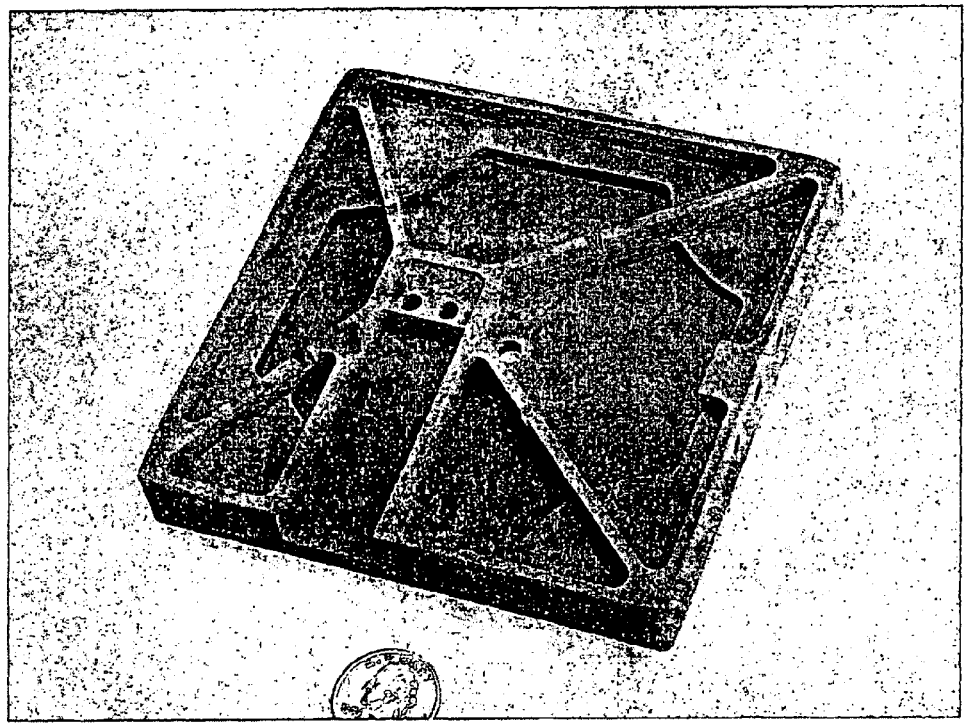
Fig. 2

METHODS FOR MAKING COMPOSITE BONDED STRUCTURES

CROSS-REFERENCE TO RELATED APPLICATIONS

This patent document claims the benefit of provisional application Ser. No. 60/264,000, filed on Jan. 24, 2001.

BACKGROUND OF THE INVENTION

1. Field of the Invention

The present invention relates to improved composite materials and the infiltration methods for producing the same. Specifically, the present invention relates to complex-shaped composite bodies produced from a bonded assemblage of smaller, simpler shapes. Even more specifically, the present invention relates to silicon carbide composites wherein preferably at least a portion of the silicon carbide is produced by reactive infiltration.

2. Discussion of Related Art

Silicon carbide composites have been produced by reactive infiltration techniques for more than thirty-five years. In general, such a reactive infiltration process comprises contacting molten silicon with a porous mass containing silicon carbide plus carbon in a vacuum or an inert atmosphere environment. A wetting condition is created, with the result that the molten silicon is pulled by capillary action into the mass, where it reacts with the carbon to form additional silicon carbide. This in-situ silicon carbide typically is interconnected. A dense body usually is desired, so the process typically occurs in the presence of excess silicon. The resulting composite body thus comprises silicon carbide and unreacted silicon (which typically also is interconnected), and may be referred to in shorthand notation as Si/SiC or RBSC (denoting "reaction-bonded silicon carbide").

In one of the earliest demonstrations of this technology, Popper (U.S. Pat. No. 3,275,722) produced a self-bonded silicon carbide body by infiltrating silicon into a porous mass of silicon carbide particulates and powdered graphite in vacuo at a temperature in the range of 1800 to 2300 C.

Taylor (U.S. Pat. No. 3,205,043) also produced dense silicon carbide bodies by reactively infiltrating silicon into a porous body containing silicon carbide and free carbon. Unlike Popper, Taylor first made a preform consisting essentially of granular silicon carbide, and then he introduced a controlled amount of carbon into the shaped mass. In one embodiment of his invention, Taylor added the carbon in the form of a carbonizable resin, and then heated the mass containing the silicon carbide and infiltrated resin to decompose (carbonize) the resin. The shaped mass was then heated to a temperature of at least 2000 C in the presence of silicon to cause the silicon to enter the pores of the shaped mass and react with the introduced carbon to form silicon carbide.

Hillig and his colleagues at the General Electric Company took a different approach, where fibrous versions of Si/SiC composites were produced by reactively infiltrating carbon fiber preforms.

More recently, Chiang et al. (U.S. Pat. No. 5,509,555) discloses the production of silicon carbide composite bodies through the use of a silicon alloy infiltrant. The preform to be infiltrated by the alloy can consist of carbon or can consist essentially of carbon combined with at least one other material such as a metal like Mo, W, or Nb; a carbide like SiC, TiC, or ZrC; a nitride like $Si_3N_4$, TiN or AlN; an oxide like $ZrO_2$ or $Al_2O_3$; or an intermetallic compound like $MoSi_2$ or $WSi_2$, or mixtures thereof The liquid infiltrant includes silicon and a metal such as aluminum, copper, zinc, nickel, cobalt, iron, manganese, chromium, titanium, silver, gold, platinum and mixtures thereof.

In a preferred embodiment of the Chiang et al. invention, the preform can be a porous carbon preform, the liquid infiltrant alloy can be a silicon-aluminum alloy containing in the range of from about 90 at % to about 40 at % silicon and in the range of from about 10 at % to about 60 at % aluminum and the carbon preform can be contacted with the silicon-aluminum alloy at a temperature in the range of from about 900 C to about 1800 C for a time sufficient so that at least some of the porous carbon is reacted to form silicon carbide. Upon cooling, the dense composite formed thereby can be characterized by a phase assemblage comprising silicon carbide and at least one phase such as silicon-aluminum alloy, a mixture of silicon and aluminum, substantially pure aluminum or mixtures thereof.

M. Singh describes the joining of silicon carbide-based ceramic materials for high temperature applications. Specifically, he applies a carbonaceous mixture to the join area, and then cures the carbonaceous material at 110–120 C for 10 to 20 minutes to fasten the pieces together. Then silicon or silicon alloy is applied to the joint region and heated to 1250–1425 C for 5 to 10 minutes. The molten silicon or silicon alloy reacts with the carbon to form silicon carbide with controllable amounts of silicon and other phases as determined by the alloy composition. This reaction forming approach has been used to produce strong joints in commercially available reaction-bonded and sintered silicon carbide-based materials. Singh states that his reaction forming technique is unique in its ability to produce joints with tailorable microstructures, but he advances no suggestion of incorporating one or more filler materials into the joint region. He does recognize, however, that it may be important to tailor the thermomechanical properties of the joint region to be close to those of the silicon carbide-based materials being joined. (M. Singh, *Industrial Heating*, Sep. 1997, pp. 91–93)

U.S. Pat. No. 4,070,197 to Coes discloses the formation of a gas impermeable hollow silicon carbide body. Specifically, Coes first forms two separate hollow silicon carbide bodies by a slip-casting method. Then the two separate bodies are cemented together by means of a silicon carbide slip, preferably containing a binder such as sodium silicate. The joined pieces are then fired at a temperature sufficiently high as to recrystallize the silicon carbide, thereby forming a recrystallized joint between the pieces. The body is then exposed to a silicon atmosphere, which deposits silicon in the body to form a dense, gas-impermeable structure. In a modification of the preferred embodiment, additional carbon may be provided in the product prior to the final siliconizing operation so as to form additional grains of silicon carbide in the final fired and siliconized structure.

It is an object of the present invention to produce a silicon carbide composite body to near-net shape, thereby minimizing the amount of grinding and/or machining necessary to achieve the required dimensions of the finished article.

It is an object of the present invention to produce a solid, strong, unitary-silicon carbide composite structure from a bonded assemblage of smaller structures.

It is an object of the present invention to be able to produce a solid, strong, unitary silicon carbide composite structure of a shape that might otherwise be too complex or too difficult to produce as a single body from its inception.

It is an object of the present invention to provide a more reliable method to temporarily bond preforms to one another until subsequent infiltration provides a permanent bond.

It is an object of the present invention to provide at least one metal to the silicon infiltrant to produce a silicon carbide composite body containing some of this metal, thereby enhancing its properties and further extending its capabilities.

SUMMARY OF THE INVENTION

These objects and other desirable attributes of the present invention are accomplished through the use of techniques to bond two or more smaller bodies or subunits to produce a unitary SiC composite structure of larger size.

In a first aspect of the present invention, two or more preforms are bonded together with an adhesive or cement composition that imparts at least strength sufficient for handling during subsequent thermal processing. The adhesive should also contain a carbonaceous material, although the carbonaceous material itself is not required to be the substance that provides the bonding characteristics. In a preferred embodiment, the adhesive or cement contains one or more filler materials, and preferably in the same proportion as any filler making up the porous mass to be infiltrated.

In a second aspect of the present invention, instead of providing the subunits to be bonded in the form of preforms, the subunits may be dense, SiC composite bodies, e.g., RBSC, sintered or hot pressed silicon carbide bodies.

In each of the above embodiments, a preferable means for bonding two or more subunits combines aspects of adhesive and mechanical locking characteristics. For many of the applications envisioned, dimensional control is critical, and it is very important accordingly to insure that the subunits do not move relative to one another during the bonding operation. One way to accomplish this objective is to incorporate a mechanical locking feature to the joining means, e.g., a "keyway" feature. Often during thermal processing, adhesive binders may be pyrolyzed or even removed completely, thereby leaving the bonded subunits in a weak condition. The mechanical locking feature thus substitutes for, or supplements the binder qualities of the adhesive, which is especially important when the adhesive itself may become weakened, for example, as a result of thermal processing.

In one sub-embodiment, the mechanical locking means takes the form of a small, shaped insert (a "key"). At least at some point, the key features RBSC material. In preferred embodiment, the key is provided as a preform, and mechanically locks the subunits together as a preform. This mechanical locking preform is subsequently infiltrated, thereby forming a RBSC key and bonding the subunits to one another. In another sub-embodiment of this preferred embodiment, however, the key may be provided already in the as-infiltrated condition.

In a larger context, the instant invention is not limited to RBSC systems, but should be useful in producing many kinds of composite bodies where the matrix phase of the composite is formed by an infiltration route, whether with or without a pressure or vacuum assist, or involving substantial chemical reaction, or very little to no chemical reaction associated with the infiltration.

Definitions

"Inert Atmosphere", as used herein, means an atmosphere that is substantially non-reactive with the infiltrant or the permeable mass or preform to be infiltrated. Accordingly, this definition includes gaseous constituents that might otherwise be thought of as mildly reducing or mildly oxidizing. For example, forming gas, comprising about 4 percent hydrogen, balance nitrogen, might be considered to be an inert atmosphere for purposes of the present disclosure, as long as the hydrogen does not reduce the filler material and as long as the nitrogen does not appreciably oxidize the infiltrant or filler material.

"RBSC", as used herein, means "Reaction Bonded Silicon Carbide".

"Reaction-Bonding", "Reaction-Forming", "Reactive Infiltration", "Melt Infiltration" or "Self-Bonding", as used herein, means the infiltration of a permeable mass comprising carbon in a form that is available to react with an infiltrant comprising silicon to produce a ceramic body comprising at least some silicon carbide produced in-situ.

BRIEF DESCRIPTION OF THE DRAWINGS

FIGS. 1A and 1B are side and top schematic views, respectively, of an arrangement of materials used to produce a silicon carbide composite "U-channel" in accordance with Example 1;

FIG. 2 is a photograph of a silicon carbide composite air bearing support frame produced in accordance with Example 3;

DETAILED DESCRIPTION OF THE INVENTION AND PREFERRED EMBODIMENTS

Figure 3:
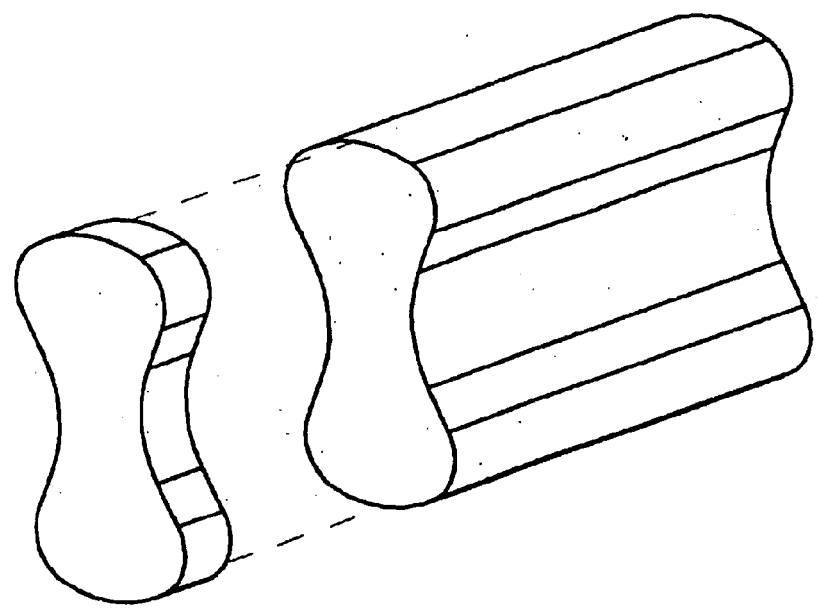
FIG. 3 is an isometric view of a section of a "key" or mechanical locking preform that has been sliced off of a piece of preform bar stock.

By way of review of the fundamental reaction-bonding process as used in connection with the production of silicon carbide composite bodies, a permeable mass containing at least some carbon is infiltrated with a molten infiltrant comprising silicon. At least at some point during the infiltration, the silicon component of the infiltrant chemically reacts with at least a portion of the carbon in the permeable mass to form silicon carbide. Typically, some infiltrant material remains in the infiltrated body, and distributed throughout. The body thus formed containing in-situ silicon carbide and residual infiltrant material is therefore a composite body.

If the starting amount of infiltrant material is insufficient to fill the interstices of the permeable mass, at least some of the residual, unreacted infiltrant material in the body may be distributed as discrete, isolated pockets. Usually an excess of infiltrant material is supplied to the permeable mass, and the residual infiltrant in the composite body then is generally interconnected.

The present invention encompasses placing the infiltrant material within the permeable mass to be infiltrated, or at an interface between the mass and an adjacent body of the infiltrant material. The infiltrant material may be placed into direct contact with the permeable mass to be infiltrated, or the infiltrant material may remain substantially isolated from the permeable mass, with a wicking means interposed between the two to create a pathway or conduit for the molten infiltrant material to migrate toward and into the permeable mass. The wicking means could be most any material that is wet by molten infiltrant material, with silicon carbide being preferred.

The present invention has as a primary objective the fabrication of solid, unitary RBSC composite structures produced as a result of gathering together a number of smaller structures, or subunits, and bonding the subunits to one another. There are a number of reasons for desiring to carry out such a procedure. For example, the bonding techniques of the present invention can be used to produce structures whose shape is more complex than can be fabricated from the infiltration of a single permeable mass or preform. Moreover, it may be impossible to perform certain machining operations on the final, unitary structure, whereas the machining might be easily performed on the individual subunits prior to assembly and bonding. Still further, it might be economically desirable from a scrap or yield perspective to minimize the number of machining operations performed on the final, unitary structure. In other words, if a RBSC part becomes scrap due to defective machining, better that the scrap part be a subunit rather than the final unitary RBSC body due to the large cost invested in a shaped RBSC body during the final processing operations, such as machining.

In a first aspect of the present invention, two or more preforms are bonded together with an adhesive or cement that imparts at least strength sufficient for handling during subsequent thermal processing. The adhesive or cement contains carbon in some form amenable to being pyrolyzed to a form that is conducive to the reaction-bonding process, e.g., elemental carbon. Sugar-based resins, as well as those based on epoxy have been found to be entirely satisfactory for providing temporary preform bonding qualities, as well as providing the carbon source for subsequent reaction-bonding during infiltration. In a preferred embodiment, the adhesive or cement composition also contains one or more filler materials, and preferably being substantially identical to any filler material making up the porous mass to be infiltrated.

In a second aspect of the present invention, instead of providing the subunits to be bonded in the form of preforms, the subunits may be dense, SiC composite bodies, e.g., RBSC bodies.

In each of the above embodiments, a preferable means for bonding two or more subunits combines aspects of adhesive and mechanical locking characteristics. For many of the applications envisioned, dimensional control is critical, and it is very important accordingly to insure that the subunits do not move relative to one another during the bonding or infiltration operations. One way to accomplish this objective is to incorporate a mechanical locking feature to the joining means, e.g., a "key and keyway" feature. Often during thermal processing, adhesive binders may be pyrolyzed or even removed completely, thereby leaving the bonded subunits in a weak condition. The mechanical locking feature thus substitutes for, or supplements the binder qualities of the adhesive, which is especially important when the bonding power of the adhesive itself may become compromised during subsequent thermal processing.

In a preferred embodiment, the mechanical locking means takes the form of a small, shaped insert (a "key"). At least at some point, the key features RBSC material. In a preferred embodiment, the key is provided as a preform, and mechanically locks the subunits (either preform or densified SiC) together, and is subsequently infiltrated, thereby forming a RBSC key and bonding the subunits to one another. In another embodiment, however, the key may be provided in the as-infiltrated condition.

The key is designed to engage a keyway. The keyway is a hollowed-out region having a shape inverse to that of the key. The keyway may extend only partway into the surface of a subunit (e.g., a "blind" hole), or may extend completely through, for example, a wall of the subunit. The keyway is provided at a location such that it is intersected by the boundary between the subunits to be joined. When the subunits are brought together and the key is inserted into the keyway, the subunits are locked together, or at least are restrained in movement with respect to one another.

The present invention contemplates producing in-situ silicon carbide. Accordingly, at least one constituent of the infiltrant material comprises silicon. The infiltrant may also contain one or more other constituent(s) that may be capable of producing some desirable effect during processing or on the final character or properties of the resulting composite body. For example, the non-silicon constituent(s) may give rise to an infiltrant alloy having a lower liquidus temperature than the melting point of pure silicon. A reduced liquidus temperature might then permit the infiltration to be conducted at a lower temperature, thereby saving energy and time, as well as reducing the tendency for the infiltrant to over-infiltrate the boundaries of the preform or permeable mass into the supporting materials. A non-silicon constituent infiltrated into the permeable mass along with the reactive silicon constituent may produce superior properties of the resulting composite body—enhanced strength or toughness, for instance. A non-silicon constituent so infiltrated may also counterbalance the expansion of the silicon phase upon solidification, a desirable result from a number of standpoints, as will be discussed in more detail later. Elemental non-silicon constituents that fulfill one or more of the advantageous attributes include aluminum, beryllium, copper, cobalt, iron, manganese, nickel, tin, zinc, silver, gold, boron, magnesium, calcium, barium, strontium, germanium, lead, titanium, vanadium, molybdenum, chromium, yttrium and zirconium. Preferred constituents include aluminum, copper, iron, nickel, cobalt and titanium. Particularly preferred are aluminum and copper.

One such alloying element that has been identified as fulfilling all three desirable attributes is aluminum. The present inventors have observed that a silicon carbide composite body that also contains some aluminum phase is substantially tougher than a silicon carbide composite containing residual, unreacted silicon. Still further, the present inventors have discovered that when the residual infiltrant component of the composite body comprises about 40 to 60 percent by weight silicon and 60 to 40 percent aluminum, the volume change of the residual infiltrant phase is practically zero. In a particularly preferred embodiment, a preform comprising silicon carbide particulate and about one to several percent by weight of carbon may be readily infiltrated in a rough vacuum at about 1100 C with an infiltrant alloy comprising roughly equal weight fractions of silicon and aluminum to produce a composite body comprising silicon carbide plus residual alloy having a composition of about 40 to 45 percent by weight silicon, balance aluminum. In addition, the present inventors have discovered that at this lower infiltration temperature of about 1100 C, a loose mass of silicon carbide particulate can be used to support the permeable mass or preform to be infiltrated without itself being infiltrated by the molten infiltrant. This discovery greatly simplifies the furnacing operation and obviates the need for expensive graphite fixturing and tooling.

In general, the temperature at which the infiltration is conducted is the lowest at which infiltration occurs quickly and reliably. Also, in general, the higher the temperature, the more robust is the infiltration. Unnecessarily high infiltration temperatures are not only wasteful in terms of energy costs and the extra heating and cooling time required, but the more likely it is that undesired reactions can occur. A number of ceramic materials that are usually thought of as being inert and uninfiltratable at moderate temperatures (e.g., aluminum oxide, boron nitride, silicon nitride) can lose their inert character or are infiltrated by silicon at elevated temperatures (e.g., about 1500 C and above), particularly under vacuum. Thus, it becomes quite a challenge to house or support a permeable mass to be infiltrated and to minimize the degree of over-infiltration into the supporting material, or reaction therewith. Such over-infiltration typically results in the over-infiltrated material being bonded to the infiltrated mass, necessitating costly grinding or diamond machining for its removal. Another problem with unnecessarily excessive infiltration temperatures is that the non-silicon constituent(s) may have a higher vapor pressure than the silicon component, with the undesirable result that such constituent is readily volatilized out of the infiltrant alloy, changing the alloy chemistry and contaminating the furnace.

The atmosphere in which the infiltration of a silicon-containing alloy is conducted is usually one that is inert or mildly reducing. Accordingly, argon, helium, forming gas and carbon monoxide may be used. A vacuum environment is preferred, however, at least from the standpoint of facilitating the reliability or robustness of infiltration.

Of course, the mass or preform to be infiltrated by the silicon-containing infiltrant must be one that is permeable to the infiltrant under the local processing conditions. Given sufficient temperature, e.g., about 2150 C, pure silicon carbide can be infiltrated by silicon in a pressureless manner (see for example, U.S. Pat. No. 3,951,587 to Alliegro et al.), but more typically, the permeable mass contains some elemental or free carbon to facilitate the process. The more carbon that is present, the more silicon carbide that is produced in-situ. While it is possible to reactively infiltrate a permeable mass containing large amounts of carbon, such is generally undesirable in the context of the present invention because the infiltrant alloy will change too much from one zone in the preform to the next. Large compositional changes are usually undesirable for at least two reasons: First, the altered alloy composition may be such that it no longer wets the permeable mass to be infiltrated. Second, a permeable mass that is successfully fully infiltrated would have to be maintained at some elevated temperature for a period of time to allow the distribution of constituents of the infiltrant phase to equilibrate. For large components, such "annealing times" could be so long as to be impractical.

While it is certainly possible to infiltrate masses containing larger amounts of carbon, what is preferred in this invention is a permeable mass containing less than about 25 percent by weight carbon, and more preferably less than about 10 percent. For many of the products contemplated by the present invention, a representative selection of which are shown in some of the Examples, a particularly preferred range is about 1 percent to about 5 percent.

The balance of the permeable mass may comprise one or more materials that are substantially inert under the process conditions, e.g., "filler materials". Candidate filler materials for use in the present invention would include the carbides such as SiC, $B_4C$, TiC and WC; the nitrides such as $Si_3N_4$, TiN and AlN; the borides such as $SiB_4$, $TiB_2$, and $AlB_2$; and oxides such as $Al_2O_3$ and MgO. The form of the filler material may be any that can be produced, for example, particulate, fiber, platelet, flake, hollow spheres, etc. The filler material bodies may range in size from submicron to several millimeters, with sizes ranging from several microns to tens of microns being common. Filler material bodies having different sizes may be blended together, for example, to increase particle packing.

The inventors appreciate that many of the above-mentioned materials are not intrinsically infiltratable by silicon-containing melts under reasonable infiltration conditions. Thus, some of these materials might be candidates as bedding materials, to be described in more detail later. However, by applying a coating material that is wettable and/or reactive with the silicon-containing infiltrant material, for example, carbon, at least some degree of infiltration can be achieved.

Permeable masses comprising one or more filler materials may range appreciably in terms of their packing or theoretical density. For example, a permeable mass comprising flakes or a reticulated structure may be only 5 to 10 percent dense. At the other extreme, a sintered preform may be 90 to 95 percent dense. As long as the preform is capable of being wetted by the infiltrant material and contains interconnected porosity, it should be capable of being infiltrated to form the composite bodies of the present invention.

The form of the carbon component, on the other hand, is significant, especially when attempting to infiltrate filler materials that are normally difficult to infiltrate, e.g., the oxides. While carbon in particulate form may be satisfactory for infiltrating a mass of silicon carbide, other fillers may necessitate that the carbon be reticulated or forming a network or skeletal structure. Especially preferred is carbon in the form of a coating on the filler material bodies. Such a form of carbon can be achieved by introducing the carbon into the permeable mass in liquid form, as for example, a resin. The permeable mass containing such a carbonaceous resin is then thermally processed to decompose or pyrolyze the resin to solid carbon, which may be graphite, amorphous carbon or some combination thereof. A number of carbonaceous resins are available including epoxy resins, phenolic resins and furfuryl alcohol. Preferred however, are carbohydrate-based resins, and particularly preferred are the sugar-based resins. These resins generally are water-soluble and as such, are much more "friendly" in terms of environmental and human health.

In addition to assisting in the infiltration process, another important role played by the carbonaceous resin is that of a binder. Although one can infiltrate a loose mass of filler material, the more preferred route, especially where the goal is to make an article of some particular and desired shape, is to use a self-supporting preform. Typically, a loose mass of filler material is mixed with a binder, preferably here a carbonaceous binder, and then pressed or cast or molded to a desired shape using techniques known in the art. Curing the binder then renders the formed body self-supporting.

In another embodiment, careful observation of the differences in infiltratability of various permeable masses has enabled these differences to be exploited to advantage. Specifically, those materials that are substantially non-infiltratable under the process conditions can be used as bedding materials for supporting the permeable mass to be infiltrated. This result is significant because the bedding materials are usually significantly cheaper than graphite molds or "boats".

Through careful observation and experiment, the present inventors have noted the general conditions (or trends in changing conditions) whereby infiltration tends to occur or is enhanced, and those conditions under which infiltration tends not to occur, or tends to be inhibited. For example, the inventors have observed that reactive infiltration of an infiltrant comprising silicon into a permeable mass comprising carbon occurs more robustly when the carbon is present in elemental form rather than chemically combined with other elements. Furthermore, the infiltration is more robust when the elemental carbon is present in three-dimensionally interconnected form, as opposed to discrete particle form. When the permeable mass comprises a component other than elemental carbon, for example, aluminum nitride, the three-dimensionally interconnected elemental carbon phase could be present as, for example, a coating on at least some of the aluminum nitride bodies. Moreover, the infiltration is more robust when the temperature of infiltration is increased, both in terms of absolute temperature as well as in terms of the homologous temperature (e.g., percentage or fraction of the melting temperature). Still further, infiltration is more robust when conducted under vacuum as opposed to inert gas atmosphere such as argon.

Accordingly, with these parameters in mind, it is possible to design an infiltration setup whereby a first permeable mass to be infiltrated is supported by a permeable mass which differs in at least one respect with regard to that which is to be infiltrated, and the liquid infiltrant can be caused to infiltrate the first mass but not the supporting mass.

It is well known that a permeable mass comprising silicon carbide, for example, is infiltratable by silicon melts to produce a composite body. In the absence of free carbon, however, silicon carbide is reliably infiltrated by silicon (e.g., "siliconizing") only at temperatures well above the melting point of silicon. At temperatures just slightly above the silicon melting point, infiltration becomes rather difficult. If a metal like aluminum is alloyed with the silicon, the melting point or liquidus temperature is depressed, and the processing temperature similarly can be decreased, which further reduces the propensity for infiltration. Under these conditions, such silicon carbide material can be used as a bedding or barrier material. One desirable aspect of using silicon carbide as a bedding material is that in situations where impurities or contamination is an issue (e.g., semiconductor applications), the same source of silicon carbide can be used as a bedding material as is used as a permeable mass to be infiltrated without exposing the resulting silicon carbide composite body to alien or additional contaminants.

Conversely, under the same infiltration conditions as described immediately above, a silicon-containing alloy may infiltrate a silicon carbide mass containing free carbon at the relatively low processing temperatures, particularly if the elemental carbon is three-dimensionally interconnected in a reticulated structure. Such a structure may result when carbon is added to a permeable mass as a resin and the resin is subsequently pyrolyzed. Thus, it is possible to support a permeable mass comprising silicon carbide plus elemental carbon on a bedding of silicon carbide particulate not containing such free carbon, and infiltrate only the permeable mass with silicon-containing infiltrant material. Further, because a silicon-aluminum alloy is capable of discriminating between permeable masses containing free carbon in discrete versus interconnected form, conditions may be found whereby such an alloy can infiltrate the mass containing the reticulated carbon, but not the mass containing discrete particles of free carbon.

This result is significant because it dispenses with the need for graphite structures such as molds or "boats" to directly support the infiltrant material or the preform or permeable mass to be infiltrated. Not only are such large graphite structures expensive, but also the silicon-containing infiltrant has a tendency to react with and bond to the graphite, making separation and recovery of the infiltrated body difficult. The graphite boats in particular are frequently damaged or even destroyed. Additionally, such separation and recovery efforts often result in damage to the composite body, which can be relatively brittle without the toughening effects of a metal phase. While it is possible to apply a protective coating of, for example, boron nitride to the graphite boat or to the preform surface in contact therewith to prevent or minimize the bonding effect, some end uses for the formed body, such as certain semiconductor applications, cannot tolerate the potential for the presence of boron. Moreover, the boron nitride coatings are not robust infiltrant barriers, especially at the higher infiltration temperatures, and often a small breach in the coating allows the infiltrant to infiltrate and react with a large zone of the underlying graphite material. Thus, the relatively low infiltration temperatures disclosed herein permit the graphite trays or boats to be used to support the bedding material, which in turn supports the permeable mass to be infiltrated and/or the infiltrant material. This advance in the art permits these graphite structures to be reused in subsequent infiltration runs, rather than having to be discarded as scrap.

It has been noted that silicon undergoes a net volume expansion of about 9 percent upon solidification. Thus, by alloying the silicon with a constituent such as a metal that undergoes a net volume shrinkage upon solidification, it is possible to produce a composite body whose residual infiltrant material within the composite body undergoes substantially no net volume change upon solidification. Thus, the production of silicon carbide composite bodies that exhibit neither solidification porosity nor solidification exuding of metal phase can be realized.

The particularly preferred alloying element of aluminum by itself exhibits a solidification shrinkage of some 6.6 percent by volume. Under the preferred conditions of a vacuum environment and a silicon carbide permeable mass containing interconnected free carbon, infiltration can be achieved using infiltrants ranging from about 10 percent by weight silicon up to substantially 100 percent silicon. Accordingly, the residual infiltrant component of the formed silicon carbide body may range from nearly 100 percent aluminum to substantially 100 percent silicon. Thus, the volumetric change of the residual infiltrant material upon solidification can be tailored with infinite variability between negative 6.6 percent (for pure aluminum) and positive 9 percent. Although it is advantageous to reduce solidification shrinkage, say for example to negative 2 or negative 1 percent, it is highly desirable and highly advantageous to reduce solidification swelling from positive 9 percent to perhaps positive 7, positive 5 or positive 3 percent, or less. Of course, from this perspective of infiltrant shrinkage/swelling upon solidification, zero change is best.

Of the two situations, solidification porosity may be the lesser concern. With thoughtful lay-up design and excess infiltrant material or a reservoir of infiltrant supplying the mass to be infiltrated, solidification porosity largely can be avoided if the last region to freeze in the composite body can be supplied with molten infiltrant material from outside the body. Sometimes directional solidification of the composite body is employed to accomplish this desired result.

The opposite problem actually is more frequently encountered where silicon infiltrations are concerned: where the infiltrant expands upon solidification, and the composite body cannot hold the extra volume of material. The composite body thus exudes the (now) excess infiltrant. The exuded silicon may manifest itself as droplets or beads on the surface of the composite body, and often strongly bonded thereto. This nuisance material may have to be removed by grinding or grit blasting, with the concomitant risk of damaging the attached composite body. Also, it would be desirable to not have to undertake this extra manufacturing step.

An even more serious consequence of the solidification swelling of the silicon constituent is possible swelling of the entire composite structure, thereby complicating efforts to produce net-shape parts. Still worse is the risk that such solidification swelling will cause cracking of the composite body, a risk which increases as the size of the composite body increases.

Thus, the ability to reduce or even eliminate this solidification expansion of the silicon constituent of the infiltrant material by alloying the silicon with a material that shrinks upon solidification represents an important advance in the field of silicon-containing composite materials. Not only may such composite bodies be made more dimensionally accurate in the as-infiltrated condition, but may be produced without requiring an extra process step to remove the exuded silicon. Additionally, larger bodies may now be produced with less risk of cracking due to expansion of the silicon phase within the composite during cooling through its solidification temperature.

The present invention will now be further described with reference to the following non-limiting Examples.

EXAMPLE 1

This example demonstrates the fabrication of a silicon carbide composite "U channel" featuring a multi-constituent infiltrant phase.

Preforms were prepared by a sedimentation casting process. Specifically, about 25 parts of liquid were added to 100 parts of CRYSTOLON blocky (regular), green silicon carbide (St. Gobain/Norton Industrial Ceramics, Worchester, Mass.) and 8 to 12 parts of KRYSTAR 300 crystalline fructose (A.E Staley Manufacturing Co., Decatur, IL) to make a slurry. The silicon carbide particulate consisted of about 70 parts by weight of Grade F 240 (median particle size of about 44 microns) and the balance Grade F 500 (median particle size of about 13 microns). The solids and liquids were added to a plastic jar and roll mixed for about 40 hours. The slurry was de-aired in about 760 mm of vacuum for about 5 minutes. About 15 minutes prior to casting, the slurry was re-roll mixed to suspend any settled particulates.

A graphite support plate was placed onto a vibration table. A rubber mold having a cavity of the desired shape to be cast was wetted with a surfactant consisting of a 10 weight percent aqueous solution of JOY dishwashing detergent (Proctor and Gamble, Cincinnati, Ohio). The wetted rubber mold was then placed onto the graphite plate and allowed to dry. The slurry was poured into the cavity. Vibration was commenced.

After the particulates had fully settled (about 3 hours), vibration was halted. The residual liquid on the top of the casting was blotted up with a sponge. The graphite plate and the castings in the rubber mold thereon were transferred from the vibration table to a freezer maintained at a temperature of about negative 15 C. The casting was thoroughly frozen in 6 hours time.

From the freezer, the frozen casting was demolded and placed onto a graphite setter tray for drying and bisque firing. The graphite tray and preform were then placed into a nitrogen atmosphere furnace at ambient temperature. The furnace was energized and programmed to heat to a temperature of about 40 C over a period of about one-half hour, to hold at about 40 C for about 2 hours, then to heat to a temperature of about 650 C over a period of about 5 hours, to hold at about 650 C for about 2 hours, then to cool down to about ambient temperature over a period of about 5 hours. The bisque fired preform was removed from the furnace and stored until the infiltration step. This firing operation pyrolyzes the fructose, yielding a well-bonded preform containing about 2 to 3 percent by weight carbon.

The above-mentioned steps were employed to produce a "feeder" preform and a "U-channel" preform. The U-channel preform had a mass of about 182 g and had overall dimensions of about 76 mm long by about 64 mm wide by about 38 mm high. This preform consisted of a flat base and two flat walls parallel to one another and at right angles with respect to the base. The base and walls were each about 10 mm thick. The feeder preform was in the shape of a rectangular prism and measured about 89 mm long by about 11 mm wide by about 3 mm thick. During infiltration, this feeder preform would serve as a conduit for conducting molten infiltrant toward and into the U-channel preform.

A lay-up for infiltration was then prepared.

Referring to FIGS. 1A and 1B, CRYSTOLON blocky, green silicon carbide particulate 11 having a median particle size of about 216 microns (Grade F 90, St. Gobain/Norton Industrial Ceramics, Worchester, Mass.) was poured into a graphite tray 13 measuring about 400 mm square by about 50 mm in height. This silicon carbide particulate bedding material was arranged within the graphite tray so as to be slightly higher in elevation out towards the wall of the tray than towards the center of the tray.

The U-channel preform (and specifically the base portion thereof) was placed into contact with the feeder preform. More specifically, the U-channel preform was cemented to one end of the feeder preform with a slurry comprising by weight about 67 percent CRYSTOLON regular green silicon carbide particulate (Grade F 500, St. Gobain/Norton Industrial Ceramics) having a median particle size of about 13 microns, and the balance being about equal weight fractions of water and KRYSTAR 300 fructose (A.E. Staley Manufacturing Co.). Following the pyrolysis cycle to carbonize the fructose, the bonded preforms were placed onto the SiC particulate bedding material with the U-channel preform 12 at the higher elevation, and the opposite end of the feeder preform 15 extending down towards the lower elevations.

A number of fragments 17 of an infiltrant material comprising by weight about 68 percent silicon, balance substantially pure aluminum and having a total mass of about 62 g were arranged at the foot of the beam preform, at the lower elevation. Additional Grade F 90 SiC particulate was arranged in a ring 19 around the pile of infiltrant material 17 to help confine the latter once it was made molten. The graphite tray and its contents were then placed into a larger graphite container (e.g., a "boat") having a non-hermetically sealing graphite lid, thereby completing the lay-up.

The lay-up was placed into a vacuum furnace. The heating chamber was evacuated to a pressure below 100 millitorr with a mechanical roughing pump. The chamber and its contents were then heated from a temperature of about 40° C to about 1100° C over a period of about 5 hours, then held at about 1100° C for about 1 hour, then heated to about 1270° C in about 1 hour, then held at about 1270° C for about 4 hours, then cooled to about 40° C in about 6 hours.

Following this heating schedule, the boat and its contents was recovered from the vacuum furnace. The silicon-aluminum alloy had melted, infiltrated through the feeder preform and into the U-channel preform to form a dense, silicon carbide composite body. Although the feeder was bonded to the U-channel and had to be removed by cutting with a diamond saw, the infiltration of alloy into the preforms was well controlled. Specifically, there was no infiltration into the SiC particulate bedding material, nor was there exuding of excess alloy (as droplets or otherwise) from the surfaces of the infiltrated preforms.

EXAMPLE 2

This example demonstrates the fabrication of a silicon carbide composite air bearing support frame featuring a multi-constituent infiltrant phase. This example also demonstrates the fabrication of a relatively complex composite body by way of making a bonded assemblage of smaller preform subunits, and then infiltrating the assemblage.

An air bearing support frame preform was fabricated in two longitudinal sections using substantially the same sediment casting slurry as was described in Example 1. Following sedimentation casting and freezing, the preform halves were dried to a temperature of about 150 C, with a carefully controlled heating up to this temperature to avoid cracking the parts due to the potential for excessive water vapor generation. The preform halves were then additionally thermally processed in a nitrogen atmosphere substantially in accordance with the heating described in Example 1 to pyrolyze the fructose binder to carbon. The preforms could then be green machined.

After the green machining operation, the sections were cemented together with a slurry comprising by weight about 67 percent CRYSTOLON regular green silicon carbide particulate (Grade F 500, St. Gobain/Norton Industrial Ceramics) having a median particle size of about 13 microns, and the balance being about equal weight fractions of water and KRYSTAR 300 crystalline fructose (A.E. Staley Manufacturing Co.). This slurry was roll mixed for about 4 hours, and then de-aired. The mating surfaces of the preform were spray coated with KRYLON lacquer (Borden, Inc., Columbus, Ohio) to retard the water absorption somewhat during the gluing operation. The slurry was applied to one of the surfaces and the halves of the preform were brought together under light pressure. The bonded preform was then put back into the 150 C drying oven to cure the fructose in the joint region. Following a small amount of additional green machining at the bond line, the air bearing preform had approximate dimensions of about 511 mm long by about 35 mm wide by about 70 mm in height, and had a mass of about 2145 g.

A lay-up was next prepared. Specifically, CRYSTOLON regular, green silicon carbide particulate (Grade F 90, St. Gobain/Norton Industrial Ceramics) having a median particle size of about 216 microns was poured into a graphite tray measuring about 790 mm long by about 230 mm wide by about 50 mm deep and leveled to form a bedding material. The air bearing preform was placed on the bedding material. About 836 g of an infiltrant alloy comprising by weight about 68 percent silicon, balance substantially pure aluminum was placed nearby. The graphite tray was then placed into a larger graphite vessel having a non-hermetically sealing graphite lid to complete the lay-up.

This lay-up, which measured about 850 mm long by about 290 mm wide by about 240 mm high, was then placed into a vacuum furnace and thermally processed in substantially the same manner as that for Example 1, except that the temperature was maintained at about 1270 C for about 6 hours instead of about 4 hours.

After removing the lay-up from the vacuum furnace following thermal processing, it was observed that the alloy infiltrant had melted, flowed across (but not into) the silicon carbide particulate bedding material into contact with the air bearing preform, and had infiltrated the preform to produce a silicon carbide composite air bearing support frame. While there was a body of residual alloy material bonded to the air bearing at the initial contact point, the other surfaces of the support frame accurately reflected the original preform surfaces, with no infiltrant material exuding from or otherwise accumulating on a surface.

EXAMPLE 3

An air bearing support frame measuring about 120 mm square and about 19 mm in height was fabricated substantially along the lines described in Example 2 except that bonding of the two pieces was not carried out until after each piece had been infiltrated with silicon-aluminum alloy to form a reaction bonded silicon carbide composite part.

FIG. 2 shows the more complex-shaped piece of the two in the as-infiltrated condition.

EXAMPLE 4

This example demonstrates, among other important features of the instant invention, the fabrication of a silicon carbide composite beam for a precision equipment application. In particular, the beam is used as a rigid, lightweight structural member in an x, y, z stage that may be employed for high precision location of electronic components for flat panel display or printed circuit board manufacturing, for example. The example also illustrates the building of a unitary, complex structure from the bonding of two smaller subunits.

Two beam halves, a bar whose cross-section was that of the "key", several infiltrant reservoir preforms, and the components of a support and feeder preform were each prepared by a sedimentation casting process. Specifically, about 24 parts of de-ionized water were added to 100 parts of CRYSTOLON green silicon carbide (Saint-Gobain/Norton Industrial Ceramics, Worcester, Mass.) and about 6 parts of KRYSTAR 300 crystalline fructose (A.E. Staley Manufacturing Co., Decatur, Ill.) to make a slurry. The silicon carbide particulate consisted of about 70 parts by weight of Grade F240 (median particle size of about 44 microns, blocky morphology) and the balance Grade 500 RG (median particle size of about 13 microns, rounded morphology). The solids and liquids were added to a plastic jar and roll mixed for about 48 hours. The slurry was de-aired in about 760 mm of vacuum for about 5 minutes. About 15 minutes prior to casting, the slurry was re-roll mixed to suspend any settled particulates.

A graphite support plate was placed onto a vibration table. A rubber mold having a cavity of the desired shape to be cast was wetted with a surfactant consisting of a 10 weight percent aqueous solution of JOY dishwashing detergent (Proctor and Gamble, Cincinnati, Ohio). The wetted rubber mold was then placed onto the graphite plate and the surfactant was allowed to dry. The slurry was poured into the cavity. Vibration was commenced.

After the particulates had fully settled (about 3 hours), vibration was halted. The residual liquid on the top of the casting was blotted up with a sponge. The graphite plate and the castings in the rubber mold thereon were transferred from the vibration table to a freezer maintained at a temperature of about minus 15° C.

Once the casting had frozen thoroughly, the rubber mold was removed from the freezer and the frozen sediment cast preforms contained therein were demolded and placed onto a graphite setter tray for drying and bisque firing. The drying operation specifically consisted of heating in an air atmosphere oven maintained at a temperature of about 160 C until no more water was being evolved. For the bisque firing operation, the graphite trays and preforms were placed into a nitrogen atmosphere furnace at ambient temperature. The furnace was energized and programmed to heat to a temperature of about 90° C at a rate of about 40° C per hour, then to hold at about 90° C for about 2 hours, then to further heat to a temperature of about 650 C at a rate of about 100° C per hour, to hold at about 650 C for about 2 hours, then to cool down to about ambient temperature at a rate of about 200 ° C per hour. This firing operation pyrolyzed the fructose, yielding a preform containing about 2 percent by weight carbon and bonded sufficiently to permit "green" machining.

In general, diamond-plated or diamond-coated tools are used to machine the porous preforms, which machining is sometimes referred to as "green machining". Referring specifically to FIG. 3, the mechanical locking or "key" preforms were machined by slicing off approximately 5 mm thick sections from the preform bar using a commercially available band saw but featuring a diamond-coated blade. Milling and drilling operations, particularly on the beam halves, were performed using a Model VF3 CNC machining center (Haas Automation Inc., Oxnard, Calif.) with mechanical fixturing (Machine Shop Supply Company, New Castle, Del.). As an example of a typical machining parameter, a one-inch (approx. 25 mm) diameter end mill operated at about 3500 rpm and traversing the workpiece at a rate of about 20 inches (510 mm) per minute has yielded satisfactory results.

After the preform machining operation, the preform subunits consisting of the two beam halves were fired again to remove volatiles not previously removed, and to strengthen the preform bodies. Specifically, the preform subunits were heated in vacuo to a temperature of about 800 C at a rate of about 50 C per hour, then further heated to a temperature of about 1575 C at a rate of about 100 C per hour, held at about 1575 C for about 6 hours, and then cooled to substantially ambient temperature at a rate of about 100 C per hour.

The preform subunits were then cemented together using a mechanical locking preform that roughly resembled the cross-section of a "peanut".

First, the subunits were fit together without cement to insure a good fit. The mating surfaces of each preform subunit were then coated with Ciba 8603 ResinFusion™ epoxy (Ciba Specialty Chemicals Corp., East Lansing, Mich.) consisting by weight of about 15 parts hardener to 100 parts resin. This epoxy coating acts as a sealer to retard the subsequent absorption of the filled epoxy adhesive into the subunits during the gluing operation. After curing the epoxy sealer overnight, the actual bonding adhesive was prepared. The bonding adhesive comprised by weight about 68 percent CRYSTOLON green silicon carbide particulate (St. Gobain/Norton Industrial Ceramics) and the balance being the Ciba 8603 ResinFusion™ epoxy system. The silicon carbide particulate featured the same grades and proportions as was used to prepare the preform subunits. This mixture was prepared simply by adding all of the constituents to a plastic beaker and stirring by hand until the mixture was uniform.

Even with a substantial fraction of solids in the form of the SiC particulate, the bonding adhesive was fairly fluid, and could be applied to each mating surface using an eyedropper. The halves of the preform were brought together under light pressure. The assembled preform assembly was then set aside overnight to cure the epoxy component of the adhesive.

Figure 4:
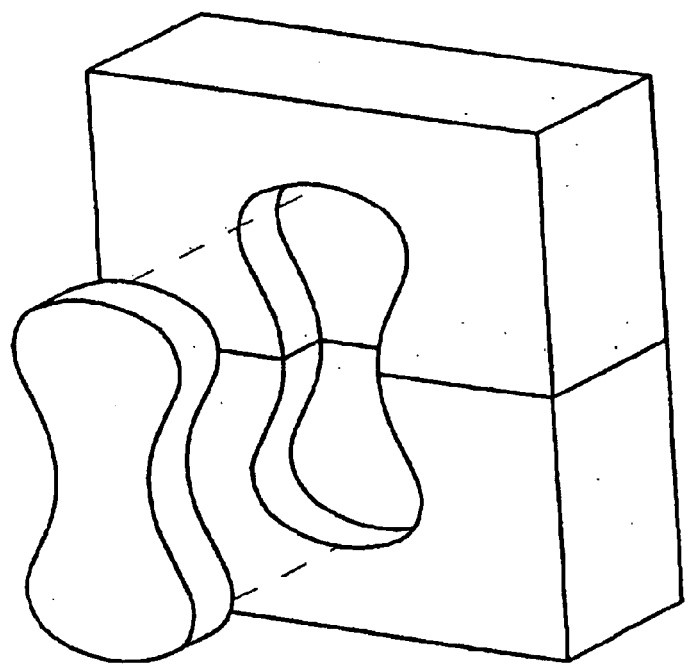
FIG. 4 is an isometric view showing how the mechanically locking preform is used to lock two preform subunits together.

The bonded subunits then had sufficient strength for handling for the mechanical locking operation. Referring to FIG. 4, the mechanical locking preform was placed against the bonded preform subunits across the bond line, and its outline was stenciled on the subunits. The interior of this outline was then milled out to a depth of about 5 mm. After checking the fit of the mechanical locking preform, the mating surfaces were sealed as described above, and then coated with the epoxy/particulate adhesive. The mechanical locking preform was then pressed into place, and the unit was cured overnight in the 150 C drying oven. After sanding the bond line and exposed portion of the mechanical locking preform to insure flushness, the final green machining operation was conducted, consisting specifically of milling an approximately 25 mm diameter hole through the beam near one end.

Following this final green machining operation, the epoxy-bonded beam preform had approximate dimensions of about 787 mm long by about 100 mm wide by about 50 mm in height, with a wall thickness of about 10 mm, and had a mass of about 4420 grams.

A lay-up for infiltration was then prepared.

Figure 5B:
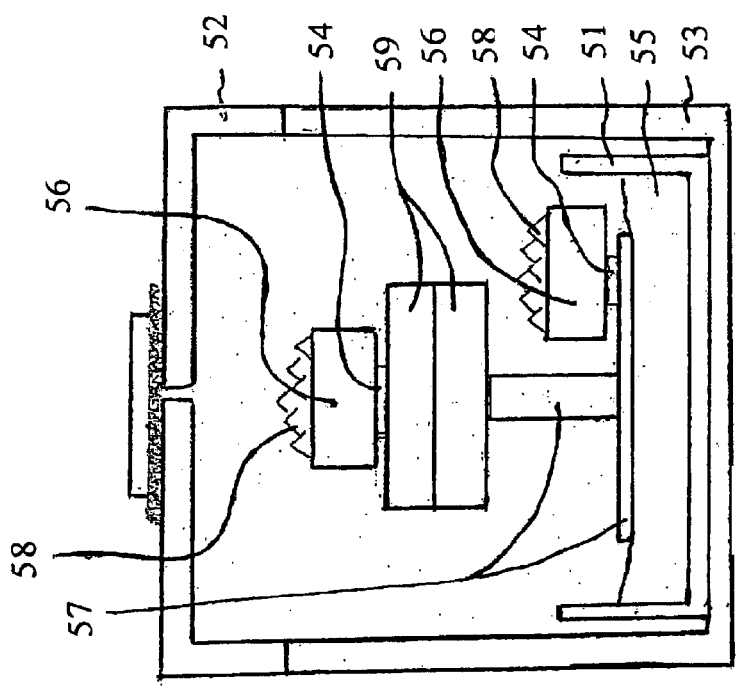
FIGS. 5A and 5B are front and side schematic views, respectively, of a setup used to produce the beam structure of Example 4.
Figure 5A:
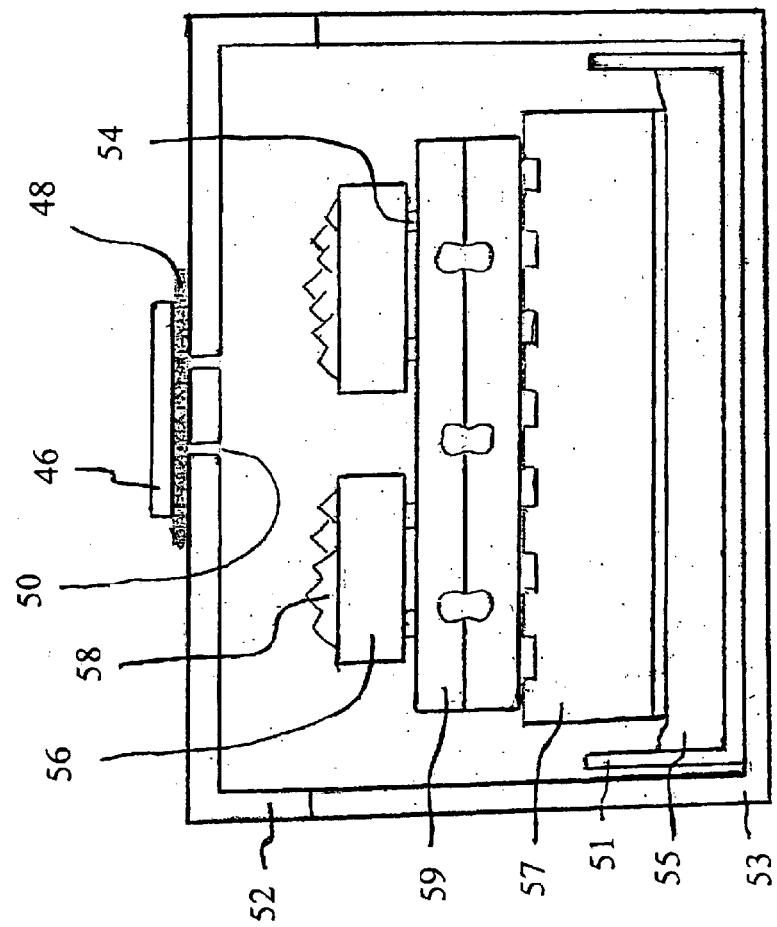

Referring to FIGS. 5A and 5B, a Grade ATJ graphite tray 51 (Union Carbide Corp., Carbon Products Div., Cleveland, Ohio) measuring about 790 mm by about 230 mm by about 51 mm deep was placed into a larger graphite chamber 53 having interior dimensions of about 825 mm long by about 270 mm wide by about 320 mm in height.

CRYSTOLON blocky, green silicon carbide particulate 55 having a median particle size of about 216 microns (Grade F 90, St. Gobain/Norton Industrial Ceramics, Worcester, Mass.) was poured into the graphite tray to a depth of about 25 mm. This silicon carbide particulate loose bedding material was arranged within the graphite tray so as to be slightly higher in elevation out towards the wall of the tray than towards the center of the tray.

Infiltration of Support and Feeder Apparatus

Like the beam, the support and feeder apparatus for infiltrating the beam preform was fabricated in sections at the preform stage, then the preform sections or subunits were bonded together. Here, however, the sections were cemented together with a slurry comprising by weight about 67 percent CRYSTOLON green silicon carbide particulate (same grades and proportions as previously mentioned in this Example), and the balance being about equal weight fractions of water and KRYSTAR 300 crystalline fructose (A.E. Staley Manufacturing Co.). This slurry was roll mixed for about 4 hours, and then de-aired. The mating surfaces of the preform were spray coated with KRYLON lacquer (Borden, Inc., Columbus, Ohio) to retard the water absorption somewhat during the gluing operation. The slurry was applied to one of the surfaces and the halves of the preform were brought together under light pressure. The bonded preform was then put back into the 150 C drying oven to cure the fructose in the joint region.

The support and infiltrant feeder apparatus preform was then positioned on top of the loose SiC particulate. A number of fragments 58 of a silicon alloy infiltrant material containing by weight about 32 percent aluminum, about 0.3 percent (max) of iron, and the balance consisting essentially of silicon were placed into a number of feeder reservoirs 56 each measuring about 133 mm long by about 64 mm wide by about 37 mm deep and being made of the same RBSC material as was intended to be formed in the support and feeder apparatus preform. The amount of silicon alloy infiltrant used was about 42 percent by weight of the mass of the support and feeder apparatus, plus an additional 10 percent to insure a slight excess of infiltrant. The reservoirs containing the infiltrant material were place in contact with the support apparatus by way of several small RBSC spacers 54. The RBSC nature of the reservoirs and spacers permits the controlled infiltration of the silicon alloy infiltrant material through the RBSC material and into the support and feeder preform to yield a RBSC support and feeder as a result. The top of the chamber was covered with a loose-fitting (non-hermetically sealing) graphite lid 52 featuring a number of approximately 1 cm diameter through-holes 50 to permit atmosphere exchange. The holes were covered with a piece of graphite felt 48 which was held in place with a graphite block 46 which served as a dead load, thereby completing the lay-up.

The lay-up was placed into a vacuum furnace. The heating chamber was evacuated to a pressure below 100 millitorr with a mechanical roughing pump, and a rough vacuum of less than about 100 millitorr residual pressure was thereafter maintained. The chamber and its contents were then heated from approximately ambient temperature to a temperature of about 800° C at a rate of about 100C per hour, then held at about 800° C for about 6 hours, then heated to about 1330° C at a rate of about 100C per hour, then held at about 1330° C for about 1 hours, then cooled to about 1200 C at a rate of about 200 C per hour, then held at about 1200 C for about 6 hours, then finally cooled to about 20° C at a rate of about 250 C per hour.

Following this heating schedule, the chamber and its contents were recovered from the vacuum furnace. The silicon alloy infiltrant had melted and infiltrated through the RBSC feeder reservoirs and spacers into the support apparatus preform, thereby converting the carbon in the preform to silicon carbide, and thus forming a dense, silicon carbide support apparatus. Only light pressure was required to separate the RBSC support apparatus that had been fabricated from the RBSC feeder reservoirs and spacers. The RBSC feeder reservoirs and spacers, and the graphite tray and containment vessel were then recovered for re-use.

Infiltration of Beam Preform

The lay-up for infiltration of the beam preform was assembled mostly in the same way as for conducting the infiltration of the support and feeder preform. Referring still to FIGS. 5A and 5B, the beam preform 59 was placed atop the RBSC support and feeder apparatus 57. The reservoirs containing about 1860 grams of the infiltrant material (same composition as immediately above) were placed in contact with the beam preform and support apparatus by way of the several small RBSC spacers 54. The remainder of the lay-up was assembled in the same way as noted previously for infiltrating the support and feeder preform. The thermal processing was also substantially the same.

Following thermal processing, the chamber and its contents were recovered from the vacuum furnace. The silicon alloy infiltrant had melted and infiltrated through the RBSC feeder reservoirs and support apparatus into the beam preform, thereby converting the carbon in the preform to silicon carbide, and thus forming a dense, silicon carbide composite beam. Only light pressure was required to separate the RBSC beam that had been fabricated from the RBSC feeder reservoirs and support apparatus. The RBSC feeder reservoirs, spacers, support apparatus, the graphite tray and containment vessel were then recovered for re-use.

The above Examples thus demonstrate that a shaped silicon carbide composite part, even one having a complex geometry, can be produced by the present reactive infiltration technique with the final composite body accurately replicating the shape and surfaces of the starting preform.

INDUSTRIAL APPLICABILITY

The methods and compositions of the present invention find utility in applications requiring the fabrication of high specific stiffness, low thermal expansion coefficient, high hardness, high thermal conductivity and/or high wear resistance structures of complex shape and/or requiring significant machining, either in the "green" state or as-infiltrated. Accordingly, the silicon carbide composite materials of the present invention are of interest in the precision equipment, robotics, tooling, and semiconductor fabrication industries, among others. Specific articles of manufacture contemplated by the present invention include gantry beams for coordinate measuring machines or "pick-and-place" machines or for various types of x-y stages, semiconductor wafer handling devices, air bearing housings or support frames, machine tool bridges and bases, and flat panel display setters.

An artisan of ordinary skill will readily appreciate that various modifications may be made to the present invention without departing from the scope of the claims, as defined herein.

What is claimed is:

1. A method for making a unitary silicon carbide composite body, comprising:

bringing at least two subunit preforms into contact with one another at a location relative to one another at which said preforms are to be joined, thereby forming a boundary zone between said subunit preforms, each of said preforms being permeable to molten silicon or silicon alloy, and each containing at least some carbon;

providing a key comprising a mechanical locking preform containing at least some carbon, and being sufficiently self-bonded as to permit its being green machined;

providing a keyway having a size and shape as to engage said mechanical locking preform, and placing said keyway across said boundary zone such that supplying of said key to said keyway will cause a mechanical locking action to occur;

placing said mechanical locking preform into said keyway, thereby restraining movement of one subunit preform relative to the other in at least one plane, and thereby forming an assemblage of preforms;

providing an infiltrant material comprising silicon;

heating said infiltrant material to a temperature above the liquidus temperature of said infiltrant material to form a molten infiltrant material;

communicating said molten infiltrant material into contact with at least a portion of said preform assemblage;

infiltrating said molten infiltrant material into said preform assemblage, and reacting at least a portion of said silicon with at least a portion of said carbon to form a composite body comprising interconnected silicon carbide and a residual infiltrant phase comprising said silicon distributed throughout said interconnected silicon carbide, thereby forming a unitary silicon carbide composite body.

2. The method of claim 1, wherein said preform comprises silicon carbide.

3. The method of claim 1, wherein said preform further comprises at least one filler material.

4. The method of claim 1, wherein at least a portion of said carbon of said preform is interconnected.

5. The method of claim 1, wherein at least said mechanical locking preform is green machined.

6. The method of claim 1, wherein at least one of said subunit preforms is green machined.

7. The method of claim 1, wherein said placing further comprises a gluing operation.

8. The method of claim 7, wherein said gluing operation comprises coating at least one bonding surface of said mechanical locking preform or said subunit preform with an adhesive system.

9. The method of claim 8, wherein said adhesive system comprises at least one filler material.

10. The method of claim 9, wherein at least one of said mechanical locking preform and said subunit preform comprises at least one filler material, and said filler material of said adhesive system features the same grades and proportions as said filler of said preforms.

11. The method of claim 9, wherein said at least one filler material comprises silicon carbide particulate.

12. A method for making a unitary silicon carbide composite body, comprising:
bringing at least two subunit preforms into contact with one another, thereby defining a location relative to one another at which said preforms are to be joined, each of said preforms being permeable to molten silicon or silicon alloy, and each containing at least some carbon;
providing a key comprising a mechanical locking reaction-bonded silicon carbide body;
providing a keyway in said adjacent preforms, said keyway being of a size and shape as to engage said mechanical locking body, and said keyway being placed at said location between said subunit preforms such that supplying of said key to said keyway will cause a mechanical locking action to occur;
thereafter placing said mechanical locking body into said keyway, thereby restraining movement of one subunit preform relative to the other in at least one plane, and thereby forming an assemblage of preforms;
providing an infiltrant material comprising silicon;
heating said infiltrant material to a temperature above the liquidus temperature of said infiltrant material to form a molten infiltrant material;
communicating said molten infiltrant material into contact with at least a portion of said preform assemblage;
infiltrating said molten infiltrant material into said preform assemblage, and reacting at least a portion of said silicon with at least a portion of said carbon to form a composite body comprising interconnected silicon carbide and a residual infiltrant phase comprising said silicon distributed throughout said interconnected silicon carbide, thereby forming a unitary silicon carbide composite body.

13. The method of claim 12, wherein said infiltrating is conducted in a temperature range of about 800C. to about 1800C.

14. The method of claim 12, wherein said infiltrant material comprises silicon and aluminum.

15. The method of claim 12, wherein said infiltrant comprises by weight from about 10 percent to substantially 100 percent of said silicon.

16. A method for making a unitary silicon carbide composite body, comprising:
bringing at least two subunit reaction-bonded silicon carbide (RBSC) composite bodies into contact with one another at a location relative to one another at which said RBSC composite bodies are to be joined, thereby rendering said subunit RBSC composite bodies adjacent to one another;
providing a key comprising a mechanical locking preform containing at least some carbon, and being sufficiently self-bonded as to permit its being green machined;
providing a keyway in said adjacent RBSC composite bodies, said keyway being of a size and shape as to engage said mechanical locking preform, and said keyway being placed at a location between said subunit RBSC composite bodies such that supplying of said key to said keyway will cause a mechanical locking action to occur;
placing said mechanical locking preform into said keyway, thereby restraining movement of one subunit RBSC body relative to the other in at least one plane, and thereby forming an assemblage of RBSC bodies;
providing an infiltrant material comprising silicon;
heating said infiltrant material to a temperature above the liquidus temperature of said infiltrant material to form a molten infiltrant material;
communicating said molten infiltrant material into contact with at least a portion of said mechanical locking preform;
infiltrating said molten infiltrant material into said mechanical locking preform, and reacting at least a portion of said silicon with at least a portion of said carbon to form from said mechanical locking preform a composite body comprising interconnected silicon carbide and a residual infiltrant phase comprising said silicon distributed throughout said interconnected silicon carbide, thereby forming a unitary silicon carbide composite body.

17. A method for making a unitary silicon carbide composite body, comprising:
bringing at least two subunit reaction-bonded silicon carbide (RBSC) bodies into contact with one another at a location relative to one another at which said RBSC bodies are to be joined, thereby forming a boundary between said subunit bodies;
providing a key comprising a mechanical locking RBSC body;
providing a keyway in said adjacent RBSC bodies, said keyway being of a size and shape as to engage said mechanical locking RBSC body, and said keyway being placed at a location between said subunit RBSC bodies such that said boundary intersects said keyway and such that supplying of said key to said keyway will cause a mechanical locking action to occur;
thereafter placing said mechanical locking RBSC body into said keyway, thereby restraining movement of one subunit RBSC body relative to the other in at least one plane, and thereby forming an assemblage of RBSC bodies; and
heating said assemblage to a temperature above the melting point of said residual infiltrant material, thereby rendering said residual infiltrant within said subunit RBSC bodies molten, and thereby causing said molten infiltrant in adjacent bodies to fuse to one another across said boundary between said subunit RBSC bodies.

18. The method of claim 17, further comprising providing a source of infiltrant material to supplement said residual infiltrant material.

19. A method for making a unitary composite body, comprising:

bringing at least two subunit preforms into contact with one another at a location relative to one another at which said preforms are to be joined, each of said preforms being permeable to a molten infiltrant, and comprising at least one filler material;

providing a key comprising a mechanical locking preform that is sufficiently self-bonded as to permit its being green machined;

providing a keyway in said adjacent preforms, said keyway being of a size and shape as to engage said mechanical locking preform, and said keyway being placed at a location between said subunit preforms such that supplying of said key to said keyway will cause a mechanical locking action to occur;

placing said mechanical locking preform into said keyway, thereby restraining movement of one subunit preform relative to the other in at least one plane, and thereby forming an assemblage of preforms;

providing an infiltrant material;

heating said infiltrant material to a temperature above the liquidus temperature of said infiltrant material to form a molten infiltrant material;

communicating said molten infiltrant material into contact with at least a portion of said preform assemblage; and causing said molten infiltrant material to infiltrate into said preform assemblage, to form an assemblage of composite bodies each comprising said at least one filler material dispersed through a matrix phase comprising said infiltrant material, thereby forming a unitary composite body.

* * * * *